UNITED STATES PATENT OFFICE.

KURT GOTTLOB, OF ELBERFELD, GERMANY, ASSIGNOR TO FARBENFABRIKEN VORM. FRIEDR. BAYER & CO., OF ELBERFELD, GERMANY, A CORPORATION OF GERMANY.

COLORED CAOUTCHOUC SUBSTANCES AND PROCESS OF MAKING SAME.

1,113,614.      Specification of Letters Patent.      Patented Oct. 13, 1914.

No Drawing.      Application filed October 16, 1912. Serial No. 726,067.

*To all whom it may concern:*

Be it known that I, KURT GOTTLOB, doctor of philosophy, chemist, citizen of the Empire of Austria-Hungary, residing at Elberfeld, Germany, have invented new and useful Improvements in Colored Caoutchouc Substances and Processes of Making Same, of which the following is a specification.

I have found that organic coloring matters can be used for coloring caoutchouc and caoutchouc-like substances by mixing the caoutchouc or caoutchouc like materials with the dye with or without the addition of a substratum and vulcanizing the colored caoutchoucs by heating with sulfur at the vulcanization temperature. It was highly surprising that the organic dyes could stand this process without injury to their valuable properties.

In order to illustrate the new process more fully the following example is given, the parts being by weight:—100 parts of rubber are mixed between rollers with 10 parts of helio fast red RL, 10 parts of sulfur and 100 parts of white of zinc and the mixture is vulcanized at 170° C. A beautiful bright red is thus obtained.

It is of course quite impossible to mention all colors which can be used in this new process. The following are types containing wide range of shades which have given highly satisfactory results; azo-colors, such as helio-bordeaux BL, helio fast yellow 8GL extra, ceres orange, etc., naturally there are a large number of other organic coloring matters which can be used. A simple test will show whether they are suitable or not and I do not limit myself to the instances mentioned.

I claim:—

1. Process for the production of colored caoutchouc, which process consists in first treating caoutchouc materials with organic dyes, and in vulcanizing them after being thus colored by heating with sulfur at the vulcanization temperature, substantially as described.

2. Process for the production of colored caoutchouc like materials, which process consists in first treating caoutchouc like materials with organic dyes, and in vulcanizing them after being thus colored by heating with sulfur at the vulcanization temperature, substantially as described.

3. Process for the production of colored caoutchouc, which process consists in first treating caoutchouc materials with organic azo dyes, and in vulcanizing them after being thus colored by heating with sulfur at the vulcanization temperature, substantially as described.

4. Process for the production of colored caoutchouc-like materials, which process consists in first treating caoutchouc-like materials with organic azo dyes, and in vulcanizing them after being thus colored by heating with sulfur at the vulcanization temperature, substantially as described.

5. As new products vulcanized caoutchouc substances comprising caoutchouc vulcanized with sulfur and colored with organic dyes incorporated therewith before the vulcanization, substantially as described.

6. As new products vulcanized caoutchouc like substances comprising caoutchouc-like substances vulcanized with sulfur and colored with organic dyes incorporated therewith before the vulcanization, substantially as described.

7. As new products vulcanized caoutchouc substances comprising caoutchouc vulcanized with sulfur and colored with organic azo dyes incorporated therewith before the vulcanization.

8. As new products vulcanized caoutchouc-like substances comprising a caoutchouc-like substance vulcanized with sulfur and colored with organic azo dyes incorporated therewith before vulcanization.

In testimony whereof I have hereunto set my hand in the presence of two subscribing witnesses.

KURT GOTTLOB.   [L. S.]

Witnesses:
     CHAS. J. WRIGHT,
     ALBERT NUFER.